United States Patent
Patel et al.

(10) Patent No.: US 11,310,074 B2
(45) Date of Patent: Apr. 19, 2022

(54) SMART NETWORK DEVICES

(71) Applicant: Ford Global Technologies, LLC, Dearborn, MI (US)

(72) Inventors: Upendra J. Patel, Canton, MI (US); Omar Makke, Oakland, MI (US); James Martin Lawlis, Brosse Pointe Farms, MI (US); Jeffrey Scott Lossing, Riverview, MI (US)

(73) Assignee: FORD GLOBAL TECHNOLOGIES, LLC, Dearborn, MI (US)

( * ) Notice: Subject to any disclaimer, the term of this patent is extended or adjusted under 35 U.S.C. 154(b) by 195 days.

(21) Appl. No.: 16/526,223

(22) Filed: Jul. 30, 2019

(65) Prior Publication Data

US 2021/0036886 A1 Feb. 4, 2021

(51) Int. Cl.
| | |
|---|---|
| *H04L 12/40* | (2006.01) |
| *H04L 12/24* | (2006.01) |
| *H04L 41/12* | (2022.01) |
| *H04L 41/0853* | (2022.01) |

(52) U.S. Cl.
CPC ........ *H04L 12/40169* (2013.01); *H04L 12/40* (2013.01); *H04L 41/0853* (2013.01); *H04L 41/12* (2013.01); *H04L 2012/40234* (2013.01); *H04L 2012/40273* (2013.01)

(58) Field of Classification Search
None
See application file for complete search history.

(56) References Cited

U.S. PATENT DOCUMENTS

| | | | |
|---|---|---|---|
| 6,420,961 B1 | 7/2002 | Bates et al. | |
| 6,792,337 B2 | 9/2004 | Blackett et al. | |
| 7,227,449 B2 | 6/2007 | Bonneau, Jr. et al. | |
| 8,157,180 B2 | 4/2012 | Cho | |
| 2017/0313173 A1* | 11/2017 | Kimes | B60K 6/445 |
| 2018/0052802 A1* | 2/2018 | Pitigoi-Aron | G06F 13/4295 |
| 2019/0385057 A1* | 12/2019 | Litichever | H04L 63/14 |
| 2020/0180524 A1* | 6/2020 | Deschenes | G05B 19/042 |

FOREIGN PATENT DOCUMENTS

| | | | | |
|---|---|---|---|---|
| DE | 102012200475 A1 | | 7/2013 | |
| EP | 3079309 A1 | * | 10/2016 | ....... H04L 12/40013 |

* cited by examiner

*Primary Examiner* — Saba Tsegaye
(74) *Attorney, Agent, or Firm* — Brandon Hicks; Bejin Bieneman PLC

(57) ABSTRACT

A first device, for communications on a communications bus is programmed to: identify a configuration on a communications bus comprising one of (1) a second LIN device and no second custom device, (2) the second custom device and no LIN device, and (3) both the second LIN device and the second custom device and select an operating mode specified for communications with the identified bus configuration. A third device for communications on the communications bus is programmed to identify that a fourth device on the communications bus is one of (1) a calibration device programmed to control two-way communications with the third device, (2) a LIN master device programmed to control two-way communications with the third device and (3) a custom master device programmed to only receive messages from the third device; and select an operating mode specified for communication with the other device.

18 Claims, 9 Drawing Sheets

SMART NETWORK DEVICES

BACKGROUND

Network devices are programmed to communicate, e.g., on communications busses, according to a communications protocol. Multiple communications protocols have been developed and are currently in use. Also, new communications protocols may be introduced from time-to-time.

DETAILED DESCRIPTION

Introduction

Figure 1:
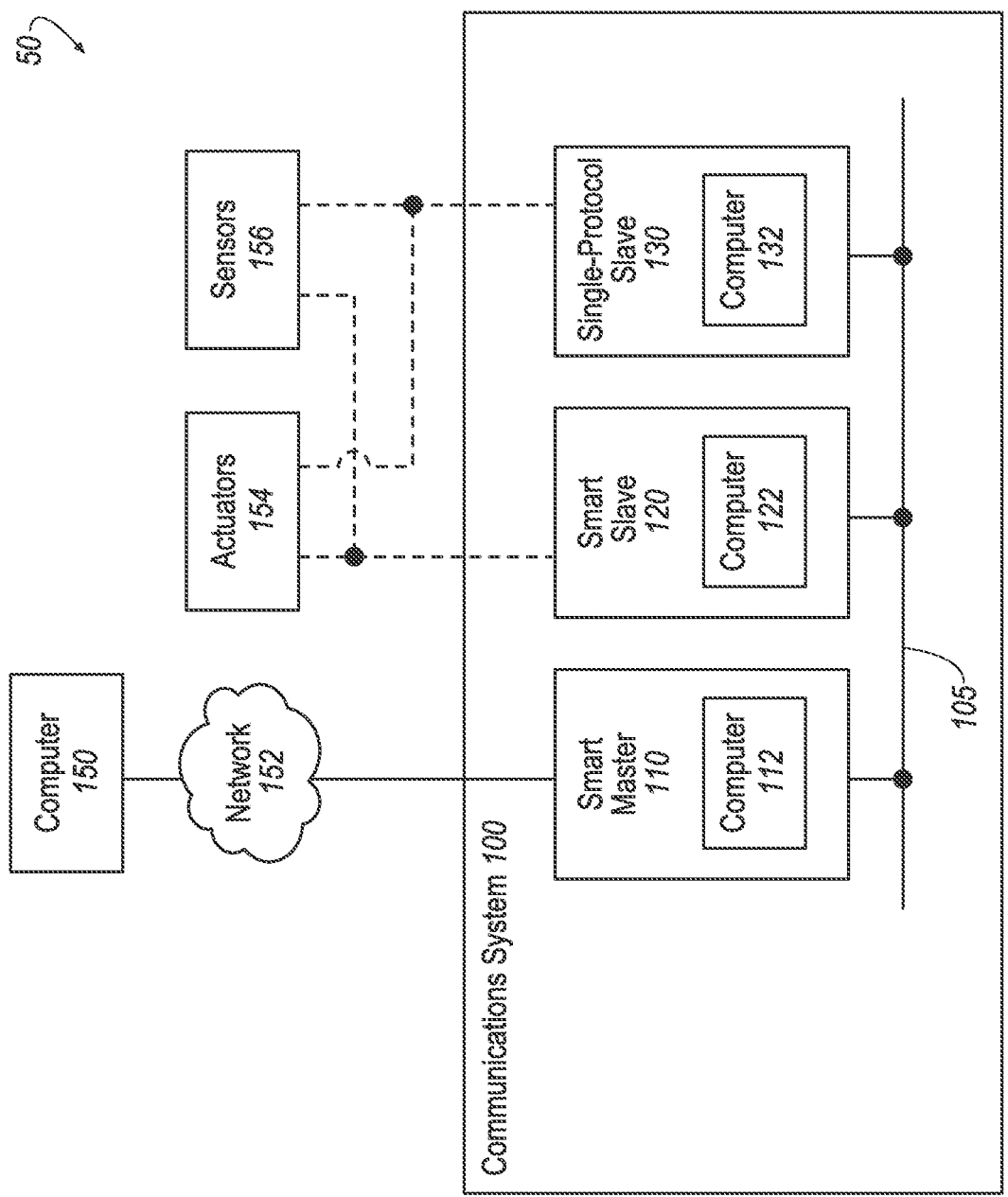
FIG. 1 is a diagram of an example bus system.

Disclosed is a first device comprising a computer including a processor and a memory, the memory including instructions such that the processor is programmed to: identify a configuration on a communications bus comprising one and only one of (1) a first bus configuration including a second LIN device and no second custom device, (2) a second bus configuration including the second custom device and no LIN device, and (3) a third bus configuration including both the second LIN device and the second custom device, wherein the second LIN device is a two-way communications device programmed to receive and respond to LIN messages from the first device and the second custom device is a one-way communications device programmed only to transmit messages to the first device. The processor is further programmed to select an operating mode specified for communications with the identified bus configuration; and control send and receive times of the first device based on the selected operating mode.

In the first device, to identify the communications bus configuration, the processor can be further programmed to: detect a power-up; and operate in a receive mode to receive a custom message from the second custom device for a first predetermined amount of time after detecting the power-up.

In the first device, the processor can be further programmed to: set an operation of the first device to communicate with second LIN devices programmed to receive and respond to LIN messages from the first device based on not receiving the custom message from the second custom device within the first predetermined amount of time after detecting the power-up.

In the first device, to identify the communications bus configuration, the processor can be further programmed to: set, upon receiving the custom message from the second custom device within the first predetermined amount of time, the first device to communicate with a possible second LIN device on the communications bus. The processor can be further programmed to transmit a LIN control message to the possible second LIN device; and listen for a response to the LIN control message from the possible second LIN device on the communications bus for a response time.

In the first device, the processor can be further programmed to: set, in a case of not receiving the response to the LIN control message within the response time, an operation of the first device to receive messages from the second custom device.

In the first device, the processor can be further programmed to: determine, based on receiving the response to the LIN control message, the second LIN device on the communications bus; and set an operation of the first device to communicate with both the second LIN device and the second custom device.

In the first device, the processor can be further programmed to: detect a data collision on the communications bus; update, based on detecting the data collision, the first predetermined amount of time; and store the updated first predetermined amount time.

In the first device, the processor can be further programmed to: operate in the receive mode to receive the custom message from the second custom device for the updated first predetermined amount of time; set, upon receiving the custom message from the second custom device within the updated first predetermined time, the first device to communicate with a possible second LIN device on the communications bus; transmit a LIN control message to the possible second LIN device; and listen for a response to the control message from the possible second LIN device on the communications bus for a response time.

Further disclosed is a first device comprising a computer including a processor and a memory, the memory including instructions to program the processor such that the processor is programmed to: identify that a second device on a communications bus is one and only one of (1) a calibration device programmed to control two-way communications with the first device, (2) a LIN master device programmed to control two-way communications with the first device and (3) a custom master device programmed to only receive messages from the first device; and select an operating mode specified for communication with the identified one of the calibration device, the LIN master device, and the custom master device.

In the first device, to identify the second device on the communications bus, the processor can be further programmed to: detect a power-up; and set a communications speed for receiving, on the communications bus, either (1) a calibration message from the calibration device or (2) a LIN message from the LIN master device.

In the first device, the processor can be further programmed to: select the operating mode specified for communications with the calibration device based on receiving the calibration message within a first predetermined amount of time.

In the first device, the processor can be further programmed to: select the operating mode specified for communications with the LIN master device based on receiving the LIN message within a first predetermined amount of time.

In the first device, the processor can be further programmed to: initiate a second timer based on receiving neither the calibration message nor the LIN message within a first predetermined amount of time.

In the first device, the processor can be further programmed to: select the operating mode specified for communications with the LIN master device based on receiving the LIN message within a second predetermined amount of time.

In the first device, the processor can be further programmed to: select the operating mode specified for communications with the custom master device based on not receiving the LIN message within a second predetermined amount of time.

In the first device, the processor can be further programmed to: detect a collision on the communications bus: and update at least one of the first predetermined amount of time and the second predetermined amount of time.

Further disclosed is a system comprising: a communications bus and a first device including a first computer including a first processor and a first memory. The first memory includes first instructions such that the first processor is programmed to: identify a configuration on the communications bus comprising one and only one of (1) a first bus configuration including a second LIN device and no second custom device, (2) a second bus configuration including the second custom device and not the second LIN device, and (3) a third bus configuration including both the second LIN device and the second custom device, wherein the second LIN device is a two-way communications device programmed to receive and respond to LIN messages from the first device and the second custom device is a one-way communications device programmed only to transmit messages to the first device; select an operating mode specified for communications with the identified bus configuration; and control send and receive times of the first device based on the selected operating mode. The system further comprises a third device including a second computer including a second processor and a second memory. The second memory includes second instructions to program the second processor such that the second processor is programmed to: identify that a fourth device on the communications bus is one and only one of (1) a calibration device programmed to control two-way communications with the third device, (2) a LIN master device programmed to control two-way communications with the third device and (3) a custom master device programmed to only receive messages from the third device; and select an operating mode specified for communication with the identified one of the calibration device, the LIN master device and the custom master device, wherein the fourth device and the first device may be a same device.

In the system, to identify a type of the second device on the communications bus, the first processor can be further programmed to: detect a power-up; operate in a receive mode to receive a custom message from the second device for a first predetermined amount of time after detecting the power-up; determine, after the first predetermined amount of time that no custom message was received; set an operation of the first device to communicate with second LIN devices programmed to receive and respond to a LIN message from the first device based on not receiving the custom message from the second custom device within the first predetermined amount of time after detecting the power-up; and transmit the LIN message on the communications bus.

In the system, to identify a type of the first device on the communications bus, the second processor can be further programmed to: detect the power-up; receive the LIN message from the LIN master device within a second predetermined amount of time after the power-up; and determine that the first device is a LIN master device based on receiving the LIN message within the second predetermined amount of time.

In the system, the second processor can be further programmed to: send a response to the first device upon receiving the LIN message; and the first processor can be further programmed to: receive the response within a predetermined response time; and determine, based on the response, that the second device is a LIN slave device.

Exemplary System Elements

In automotive and other networked systems, some network devices may communicate according to a Local Interconnect Network (LIN) standard, such as LIN 2.1, while other devices may utilize universal asynchronous receiver/transmitter (UART) based communications. Typically, a communications bus within the system will only support one communications protocol. That is, the system will include LIN communications busses to couple LIN network devices, and UART based communications busses to couple UART network devices.

LIN communications devices are two-way communications devices, with communications initiated by a first device, referred to as a master device, and answered by a second device, referred to as a slave device. In LIN communications, the first device (master device) may maintain a schedule, referred to as a LIN schedule, for communicating with one or more second devices (slave devices) on a communications bus. "On a communications bus," in this context means communicatively coupled to the communications bus.

UART based communications devices, sometimes referred to as custom communications devices herein, are one-way communications devices in which the first device (the master device) receives messages from the second device (the slave device) from time-to-time. The custom slave device is typically programmed to transmit messages at regular time intervals, for example, every 100 or 200 milliseconds. The first device operates continuously in a "receive mode," and receives the messages when they arrive. To avoid data collisions, typically, only a single custom slave device is deployed on a communications bus. As an example, this type of communications is commonly used to collect data from sensors. The sensors measure and/or collect data and at regular intervals, via a custom slave device, transmit the measured or collected sensor data to a master device.

Smart devices, programmed to identify a communications bus configuration and adapt to other devices on a communications bus, can support both LIN and custom (UART based) communications on a single communications bus. The communications bus configuration is a number and type of devices on the communications bus. The smart devices recognize communications protocols used by other, single-protocol (LIN or Custom) devices on the communications bus. Based on the types of single-protocol devices identified on the bus, the smart devices select an operating mode specified for communications with LIN devices (LIN mode), with custom devices (custom mode) or with both LIN and custom devices (hybrid mode). "Single-protocol devices" as that term is used herein means network devices that only support a single type of data communications on the communications bus. For example, a single-protocol device may only support LIN based communications or custom communications.

In addition, to support system calibration and testing, some smart devices (smart slave devices) may be programmed to identify a calibration device communicatively coupled to the communications bus. The calibration device may communicate according to LIN, custom or a calibration specific protocol. The calibration device is typically coupled to the communications bus during system manufacturing or testing to calibrate or test an operation of one or more slave devices connected to the communications bus. During the time that the calibration device is on the communications bus, master devices are disconnected from the communications bus, or otherwise disabled, so that they do not interfere with the calibration device. Upon completing calibration or testing, the calibration device is disconnected from the communications bus and the may be reconnected or re-enabled. Some smart devices (smart slave devices), in addition to recognizing LIN and custom based communications on the communications bus, can also select a calibration mode of operation specified for calibration communications with a calibration device.

A master (network) device is an input/output (I/O) device that controls the flow of communications on the communications bus. Controlling the flow of communications on the communications bus includes controlling when the communications bus can be used for transmitting and receiving messages by the master device and slave devices. Typically, there is only one master device on the communications bus. In a case where there is only one master device and one custom slave device (output only type slave device), the role of the master is reduced to only receiving communications from the custom slave device, since communications from the custom slave device are self-initiated.

A slave device may be an I/O device or simply an output device. There may be one or more slave devices on the communications bus. LIN slave devices are two-way communications devices. The LIN slave devices receive commands from a master device and respond to the commands. LIN slave devices are only permitted to transmit messages on the communications bus in response to a command from the master device. Custom slave devices transmit data on the communications bus based on a schedule maintained by the custom slave device.

Master or slave devices that only operate according to one protocol (LIN or custom) may be referred to herein as single-protocol devices.

Types of smart network devices include smart master devices and smart slave devices. Smart master devices control the flow of communications on the communications bus and additionally can identify types of slave devices (LIN or custom) and adjust communications procedures to accommodate a recognized bus configuration. A bus configuration is a number and type of network devices (single-protocol (LIN or custom) master, smart master, single-protocol (LIN or custom) slave, and/or smart slave on the communications bus. Smart slave devices detect the presence of a master device (LIN or custom) or a calibration device on the communications bus and adjust communications procedures to accommodate the bus configuration.

FIG. 1 illustrates a vehicle 50 including an example communications system 100. The communications system 100 may provide data communications between one or more components of the vehicle 50.

The communications system 100 includes a communications bus 105, a smart master device 110, zero or more smart slave devices 120, and zero or more single-protocol (LIN, Custom) slave devices 130. The smart master device 110, smart slave devices 120 and single-protocol slave devices 130 are communicatively coupled on the communications bus 105 and may be collectively referred to as the network devices 110, 120, 130.

The communications bus 105 is a mechanism for wired or wireless communications between the network devices 110, 120, 130 and typically includes a set of one or more wires physically connecting the network devices 110, 120, 130.

In an example, the communications system 100 provides communications between a computer 150, one or more actuators 154 and one or more sensors 156 in the vehicle 50.

The computer 150 may be communicatively coupled to the smart master device 110 via a network 152. In a typical example, the computer 150 may transmit to and/or receive messages from smart slave devices 120 and/or single-protocol slave devices 130 over the communications bus 105 via the smart master device 110. Messages from the computer 150 may include commands to control actuators 154. Messages received by the computer 150 may include data from sensors 156.

The smart master device 110 is a hardware component including a computer 112 and a serial port. The computer 112 includes one or more processors and memory including instructions for programming the processors. The computer 112 is programmed to control the flow of communications on the communications bus 105. The serial port is coupled to the communications bus 105 to send and receive messages.

The computer 112 in the smart master device 110, the computer 112 is additionally programmed to identify types of single-protocol slave devices 130 (LIN or custom) on the communications bus 105 and adjust communications procedures to accommodate the bus configuration.

The smart slave device 120 is a hardware component including a computer 122 and a serial port. The computer 122 includes one or more processors and memory including instructions for programming the processors. The computer 122 is programmed for communications on the communications bus 105. As described below, the computer 122 is programmed to determine whether a calibration device or a master device (which may be a smart master device 110, a LIN master device or a custom master device) is controlling the communications bus 105. In a case that the communications bus 105 is being controlled by a calibration device, the computer 122 is programmed to communicate with a calibration protocol.

In the case of the communications bus being controlled by a master device, the computer 122 is further programmed to identify the type of master device (LIN or custom) on the communications bus 105 and adjust communications procedures to accommodate the type of master device. In this case, the computer 122 initially assumes that the master device 120 is a LIN type master and waits for a LIN message from the Master device 110. In a case of receiving the LIN message, the computer 122 will communicate according to the LIN protocol. If, after a time delay, the computer 122 of the smart slave device 120 has not received a LIN message from the master device 110, then the computer 122 will assume the aster device 110 is a custom type master and will communicate by custom protocol. The serial port of the smart slave device 120 can be coupled to the communications bus 105 and to send and receive messages. One or more smart slave devices 120 may be included on the communications bus 105.

The single-protocol slave device 130 is a hardware component including a computer 132. The computer 132 includes one or more processors and memory including instructions for programming the processors. The computer 132 is programmed for communications on the communications bus 105. In the case that a single-protocol slave device 130 is a LIN slave device 130, the computer 132 is programmed to receive LIN commands from the smart master device 110 via the communications bus 105 and respond to the LIN commands. In the case that the single-protocol slave device 130 is a custom slave device 130, the custom slave device 130 only transmits custom messages on the communications bus 105. The computer 132 is typically programmed to follow a predetermined schedule for transmitting the custom messages. The serial port is coupled to the communications bus 105. In the case of a custom slave device 130, the serial port can send messages to the communications bus 105. In the case of a LIN slave device 130, the serial port can send messages to and receive messages from the communications bus 105.

Due to potential data collisions on the communications bus 105, typically only one custom slave device 130 is coupled to the communications bus 105. "Data collisions," as used herein, refers to two or more network devices sending (outputting) messages on a communications bus at a same time such that they interfere with each other. Data collisions on the data bus result in bits (high or low states) on the bus that are too long or short, messages with too many bits, messages with too few bits, and/or messages that fail checksum or other message quality checks performed on the bus to monitor message integrity.

The smart slave devices 120 and single-protocol slave devices 130 are typically communicatively coupled to and may be included in respective electronic components such as actuators 154 or sensors 156. For example, a smart slave device 120 or a LIN slave device 130 may be included in a vehicle 50 climate control system and control an actuator 154 that drives a motor to adjust a flap or valve based on instructions received from the smart master device 110. As another example, a custom slave device 130 may be communicatively coupled to a sensor 156 in a vehicle 50 and provide sensor data to the smart master device 110.

The computer 150 includes a processor and a memory such as are known. The memory includes one or more forms of computer-readable media, and stores instructions executable by the computer 150 for performing various operations, such as controlling actuators 154 and receiving data from sensors 156. The computer 150 is communicatively coupled, via a communications network 152 to the smart master device 110.

The communications network 152 is one or more mechanisms for wired or wireless communications between the computer 150 and subsystems of the vehicle 50. The network 152 can include, for example, one or more communications busses and one or more communications networks. Non-limiting examples of vehicle communications busses include Controller Area Network (CAN) busses, Local Interconnect Network (LIN) busses, and Ethernet networks. Non-limiting examples of wireless communications networks include Bluetooth, Bluetooth Low Energy (BLE), and Wi-Fi Direct. Although shown separately for discussion purposes, the communications system 100 may be included in the network 152. The computer 150, via the communications network 152, may transmit messages and/or receive messages with various devices, e.g., actuators 154; and sensors 156 in the vehicle 50.

Actuators 154 are implemented via circuits, chips, or other electronic and or mechanical components that can actuate various subsystems of the vehicle 50 in accordance with appropriate control signals. For example, for a vehicle 50, the actuators 154 may be used to control vehicle components, such as a climate control module or a power seat. In a typical example, an actuator 154 may include a motor in a climate control system. The computer 150 may transmit a command, via the network 152 and the communications system 100, to the actuator 154 to adjust a position of a flap or valve or the like in the climate control system.

Sensors 156 may include a variety of devices such as are known to provide data to the computer 150. Non-limiting examples of sensors 156 include temperature sensors, pressure sensors, rotation sensors, angle sensors, position sensors, and torque sensors. The sensors 156 may include a computer programmed for communicating with a smart slave device 120 and/or single-protocol slave device 130. In a typical application, a sensor 156 may detect a physical parameter such a temperature or pressure, and, based on the sensed physical parameter, provide data to the computer 150 via the communications system and network 152 to the computer 150.

Figure 2A:
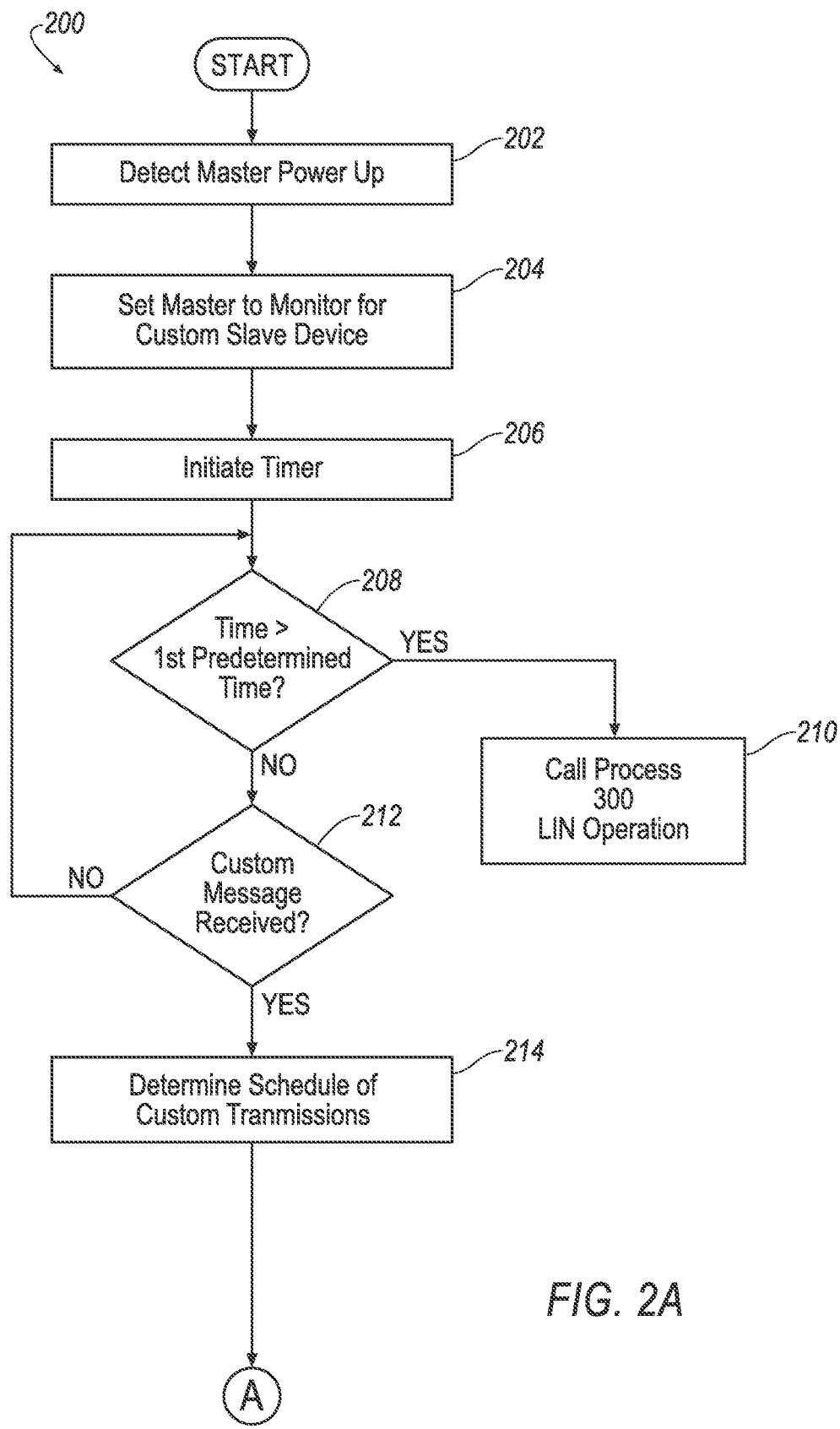
FIGS. 2A and 2B are a flowchart of an example process for a master to select an operating mode.
Figure 2B:
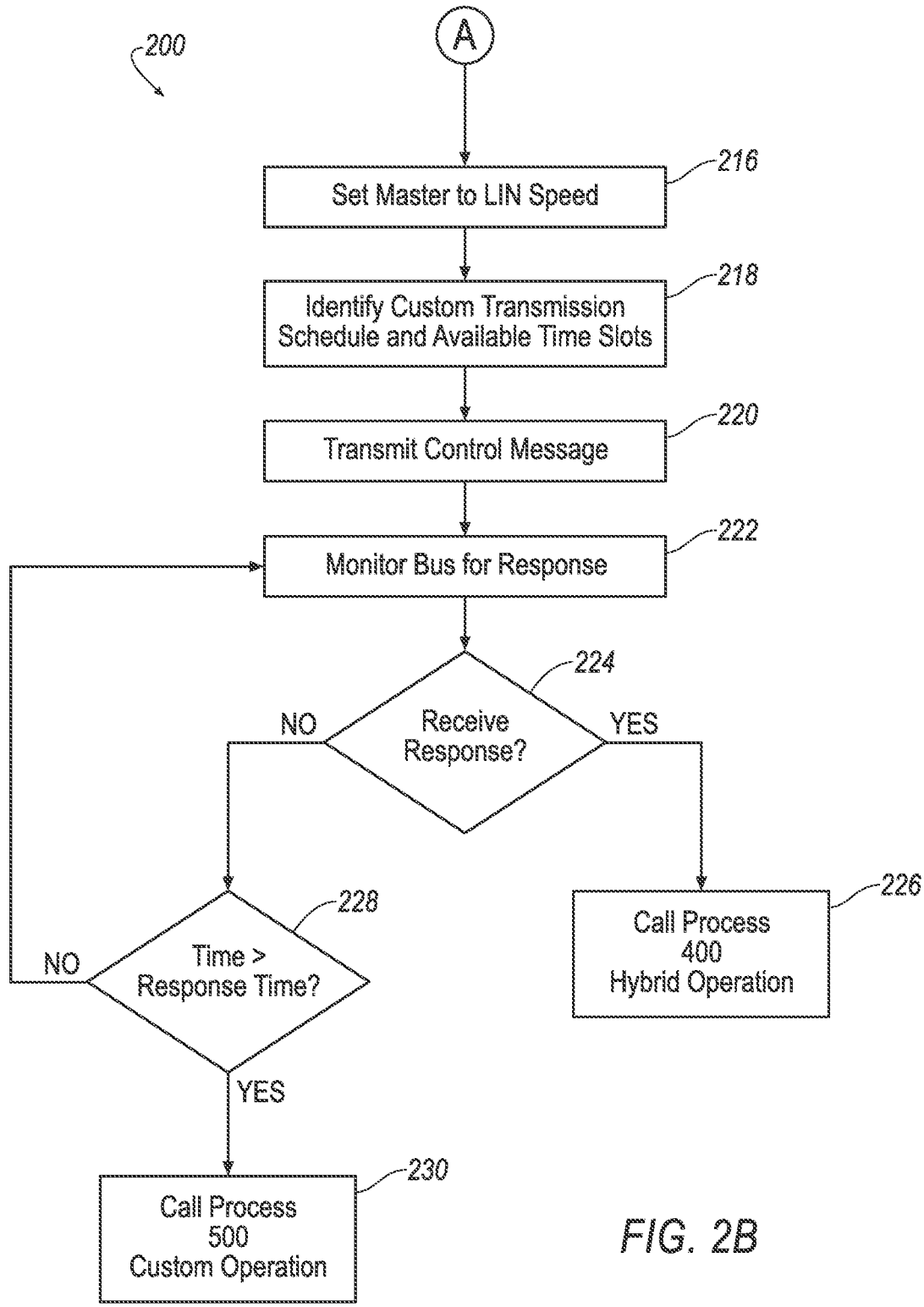

FIG. 2 is a flow diagram of an example process 200 for a smart master device 110 to select an operating mode. Selecting an operating mode means to detect the presence of smart slave devices and single-protocol slave devices 130 on the communications bus 105 and to determine whether LIN slave devices 130, custom slave devices 130, or both LIN and custom slave devices 130 are on the communications bus 105 and to select an operating mode that accommodates the identified single-protocol devices 130. In a case that only LIN slave devices 130 are on the communications bus, the smart master device 110 selects LIN operation. In a case that only a custom slave device 130 is on the communications bus 105, the smart master device 110 selects custom operation. In a case that both LIN and custom slave devices 130 are on the communications bus 105, the smart master selects hybrid operation. As noted above, smart slave devices 120 are programmed to, in the absence of recognizing a calibration device on the communications bus 105, initially assume LIN operation on the communications bus 105. The smart slave device 120, in this case, after power-up, waits for a period of time to receive a LIN message on the communications bus 105, such that the smart master device 110 can recognize the smart slave device 120 as a slave device operating in LIN mode. The process begins in a block 202.

In the block 202, the computer 112 in the smart master device 110 detects a master power up. A master power up is an event indicating that the communications bus 105 will begin operation. For example, detecting the master power up may include detecting that power has been supplied to the smart master device 110. As another example, detecting the master power up may include detecting a key-on event of a vehicle 50 which includes the communications system 100. Key-on and key-off as used herein are broadly defined as an event, action or input to respectively turn on or turn off the vehicle 50 or a portion of the vehicle 50 and may not literally involve a key. Upon detecting the master power up, the process 200 continues in a block 204.

In the block 204, the computer 112 sets the smart master device 110 to detect a presence of a custom slave device 130 on the communications bus 105. The computer 112 sets a communications speed of the serial port in the smart master device 110 to "custom speed." Custom speed is a communications speed used by custom slave devices 130. Typical custom speeds are 2400, 9600, and 19200 baud, but can range generally from 300 up to 115200 baud. The custom speed may be a parameter preprogrammed (i.e., stored in a memory) of the smart master device 110 based on specifications for custom slave devices 130 expected to be used in the communications system 100. Further, the computer 112 sets the smart master device 110 to operate as a receiver. The computer 112 begins to monitor the communications bus 105 for transmissions from a custom slave device 130. The process 200 continues in a block 206.

In the block 206, the computer 112 initiates a timer. The timer tracks the amount of time that the computer 112 monitors the communications bus 105 for a custom transmission (transmission from a custom slave device 130). The process 200 continues in a block 208.

In the block 208, the computer 112 determines whether the amount of time that the computer 112 has been monitoring the communications bus 105 is greater than a first predetermined time. The first predetermined time is time within which a custom transmission from a custom slave device 130 on the communications bus 105 would have been expected. The first predetermined time may be stored in memory of the smart master device 110 based, for example, on specifications of custom slave devices 130 that are expected to be used in the communications system 100.

In a case that the amount of time is greater than the first predetermined time, the process 200 continues in a block 210. In the case that the amount of time is less than or equal to the predetermined time, the process continues in a block 212.

In the block 210, the computer 112, based on not receiving any custom transmissions within the first predetermined time, calls process 300 to initiate LIN operation.

In the block 212, which follows the block 208, the computer 112 determines whether a custom transmission has been received on the communications bus 105. In the case that a custom transmission has not yet been received, the process 200 continues in the block 208 and continues to monitor the communications bus 105. In the case that a custom transmission has been received, the computer 112 determines that a custom slave device 130 is on the communications bus 105. The process 200 continues in a block 214.

In the block 214, the computer 112 determines a schedule of custom transmissions from the custom slave device 130. A custom slave device 130, or a smart slave device 120 operating in customer mode will have a fixed periodic time between a start of consecutive transmissions and a fixed duration of the transmissions. The computer 112 may be programmed to wait to receive at least two transmissions from the custom slave device 130. Based on an amount of time between start times of consecutive transmissions of the custom slave device 130, and the lengths of the transmissions, the computer 112 can determine a schedule of when the custom slave device 130 will and will not be transmitting on the communications bus 105. The process 200 continues in a block 216.

In the block 216, the computer 112 sets the smart master device 110, including the serial port, to LIN speed. Typical LIN speeds are 9600 and 10417 baud but can range generally from 1000 up to 20000 baud. The process 200 continues in a block 218.

In the block 218, based on the schedule of transmissions from the custom slave device 130 as determined in the block 214, the computer 112 determines available time slots for LIN operation. Available time slots for LIN operation are time periods during which the custom slave device 130 is not transmitting. The process continues in a block 220.

In the block 220, during an available time slot for LIN operation, the computer 112 transmits LIN messages per pre-defined LIN schedule tables on the communications bus 105. The LIN messages may be LIN control messages. A LIN control message may be a message that announces the presence of a master device operating in LIN mode and requests a response from LIN slave devices 130 or smart slave device 120 that may be on the communications bus 105. The process continues in a block 222.

In the block 222, the computer 112 monitors the communications bus 105 for a response to the control message. The process continues in a block 224.

In the block 224, the computer 112 determines whether a response to the control message is received. Receiving a response indicates that at least one LIN slave device 130 is on the communications bus 105. In the case of receiving a response, the process 200 continues in a block 226. Otherwise, the process 200 continues in a block 228.

In the block 226, since the computer 112 received at least one LIN response from a LIN slave device 130 and at least one custom response from a custom slave device 130, the computer 112 calls the process 400 to initiate hybrid operation for the smart master device 110. In hybrid operation, the computer 112 will operate to receive customer responses from the custom slave device 130 and, in available time slots (avoiding collisions with customer responses), will operate in LIN mode to transmit and receive messages with LIN slave devices 130.

In the block 228, which follows the block 224, the computer 112 determines whether an amount of time since the control message was sent exceeds an expected response time. The expected response time is a time within which a response from a LIN slave device 130 is expected. A LIN slave device 130, if present and addressed, should respond within the expected time after receipt of a control message from the computer 112 requesting the LIN slave device 130 to respond. The expected time (which may be referred to as a response field duration) is defined by an implementation specific LIN description file (LDF) and by LIN specifications such as ISO 17987 or SAE J2602. In the case that the amount of time since the control message was sent exceeds the expected response time, the process continues in a block 230. Otherwise, the process 200 continues in the block 222 and the computer 112 continues to monitor for a response.

In the block 230, since there was no LIN response transmitted by any smart slave device 120 or LIN slave device 130, the computer 112 calls the process 500 to initiate custom operation for the smart master device 110.

Figure 3:
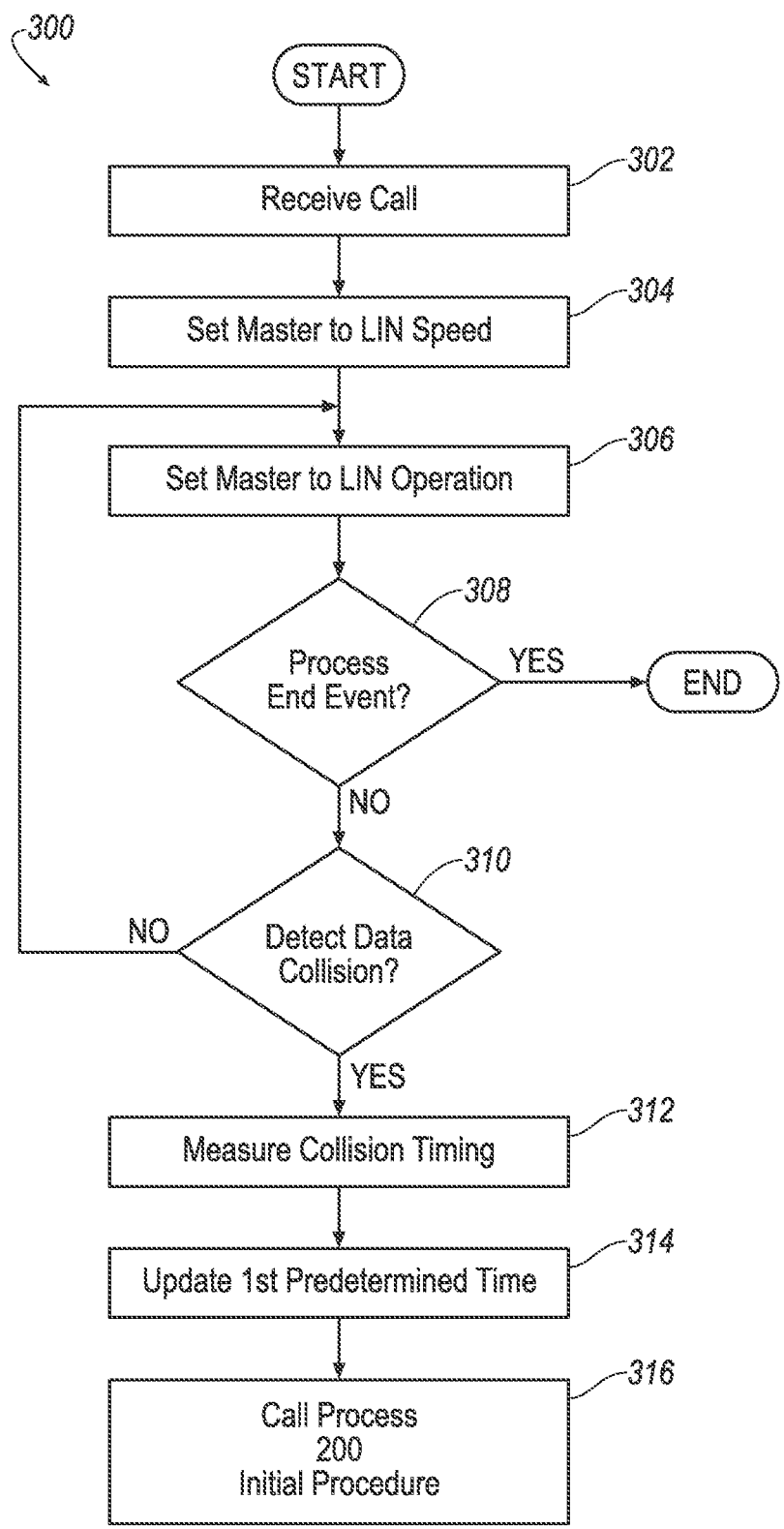
FIG. 3 is a flowchart of an example process for master LIN operation.

FIG. 3 is a diagram of an example process 300 for LIN operation for the smart master device 110. The process 300 begins in a block 302.

In the block 302, the process is 300 is activated by a call from process 200, block 208. Based on a determination in block 208 that a custom slave device 130 had not sent a message within the first predetermined time, the computer 112 places the smart master device 110 in LIN operation. LIN operation may also be referred to as LIN mode. The process 300 continues in a block 304.

In the block 304, the computer 112 sets the smart master device 110, including the serial port, to LIN speed.

Next, in a block 306, the computer sets the master to LIN operation. In LIN operation, the computer 112, from time to time (typically periodically), sends messages to LIN slave devices 130 which may be on the communications bus 105. The messages may be commands for actuators 154 and sensors 156 coupled to the respective LIN slave devices 130 to execute operations within the vehicle 50. For example, the computer 112 may send a command to a LIN slave device 130 to activate an actuator 154. As another example, the smart master device 110 may, via a LIN slave device 130, request data from a sensor 156 coupled to the LIN slave device 130. The process 300 continues in a block 308.

In the block 308, the computer 112 determines whether a process end event has occurred. A process end event is an occurrence such as an electrical signal, message or change in a parameter, indicating that the process is or will be ending. The computer 112 may determine, for example, that the process end event has occurred based on messages on the communications bus 105, based on a message from the computer 150, based on an electrical signal indicating a power down is occurring for the vehicle 50, etc. In the case that a process end event is detected, the process 300 ends. Otherwise, the process 300 continues in a block 310.

In the block 310, the computer 112 determines whether a data collision has occurred on the communications bus 105. For example, the computer 112 may recognize unexpected states of bits appearing on the communications bus 105. Unexpected states of bits may include a sequence of bits of varying length, too many or too few bits within a time period, bus states (high or low) that are too short, etc. A data collision may indicate, for example, that a custom slave device 130 is on the communications bus 105 that was not identified by the smart master device 110. This may occur because the custom slave device 130 did not transmit before the first predetermined time. As another example, a single-protocol slave device 130 may have been introduced to the communications bus 105 after a smart master power-up (block 205). As yet another example, the data collision may be due to a smart slave device 120 that began operating in custom mode due to a miscommunication (lack of message receipt) with the smart master device 110. In a case that the computer 112 determines that a data collision occurs, the process 300 continues in a block 312. Otherwise, the process 300 continues in the block 306 and the smart master device 110 continues LIN operation.

In the block 312, the computer 112 measures the timing of the data collision. For example, the computer 112 may measure an amount of time from power up until the collision occurred, and may further, upon detecting the collision, wait sufficient time to receive at least two transmissions from the custom slave device 130 to characterize a fixed periodic time between the start of transmissions as well as the durations of those transmissions. The process 300 continues in a block 314.

In the block 314, The computer 112 updates the first predetermined time. Initially, the computer 112 may increase the first predetermined time to provide a greater amount of time for identifying custom slave devices 130 on the communications bus 105.

The computer 112 may use various approaches to update the value of the first predetermined time. For example, the computer 112 may determine a modifier x to update the value of the first predetermined time. For example, for an nth collision detection, where n is the number of data collisions since the last master power up, the computer 112 may set the modifier x to be a fixed modifier. Alternatively, the computer 112 may set the modifier x to be a pseudo random number that is:

- based on a random number generator;
- calculated/interpreted based on data received by the smart master device 110;
- based on the number n;
- calculated based on mathematical operations on past and/or present date and time; and/or
- calculated based on mathematical operations based on product part number.

The above list of examples is not intended to be limiting. One or more of the above examples may be used in combination. Further, other methods for generating a pseudo random number based on system data, may be used.

Based on the modifier x, the updated first predetermined time may then be calculated according to any one or more of the following approaches:

New first predetermined time=(Previous first predetermined time)+(x).

This assumes (x)>0

New first predetermined time=(Previous first predetermined time)/\(x).

This assumes (x)>1.

New first predetermined time=(Previous first predetermined time)*(x).

This assumes (x)>1

New first predetermined time=(Sum of Previous first predetermined times)+(x).

This assumes (x)>0

Setting the modifier x based on a pseudo random number may have the benefit of preventing the smart master device 110 from locking into a first predetermined time sequence that does not optimize for a fast determination of the communications bus configuration and/or does not converge on a stable determination of the bus configuration.

Additionally or alternatively, the computer 112 may update the value for the first predetermined time based on timing measurements of the data collision. For example, the computer 112 may determine that the previously applied first predetermined time was not long enough to detect a presence of a custom slave device 130 on the communications bus 105. Based on the timing of the data collision, the computer 112 may be able to determine or estimate a timing of expected transmissions from a custom slave device 130 and adjust the first predetermined time to be based on (for example, longer than) the estimated timing between expected transmissions from the custom slave device 130.

Generally, the first predetermined time will be increased until data collisions no longer occur. Initially decrementing the first predetermined time following a data collision may result in reduced likelihood of detecting a custom slave device 130 on the communications bus 105. To avoid excessive increases to the first predetermined time, the computer 112 may apply additional constraints on x. For example, x may be limited to a value equal to or below a first modifier value. As another example, when x exceeds the first modifier value, the computer 112 may decrease a value of x until it is below a second modifier value, where the second modifier value is less than the first modifier value.

Additionally, to increase a likelihood that a smart master device 110 and a smart slave device 120 on the same communications bus 105 converge to LIN communications, the value of the modifier x for the smart master device 110 may be constrained to not track a modifier y used to adjust threshold timings in a smart slave device 120 as described below.

After establishing the first predetermined time as described above, the computer 112 for the smart master device 110 may be programmed to retain the updated first predetermined time in non-volatile memory such as EEPROM such that the first predetermined time is available following subsequent master power-up events. Further, to optimize the first predetermined time, the computer 112 may be programmed to decrement the first predetermined time following each master power-up, to iteratively seek a first predetermined time that is just above an amount of time to avoid a data collision. The process 300 continues in a block 316.

In the block 316, the computer 112 calls the process 200, starting, at block 204 and begins to monitor for a custom slave device 130 on the communications bus 105.

Figure 4:
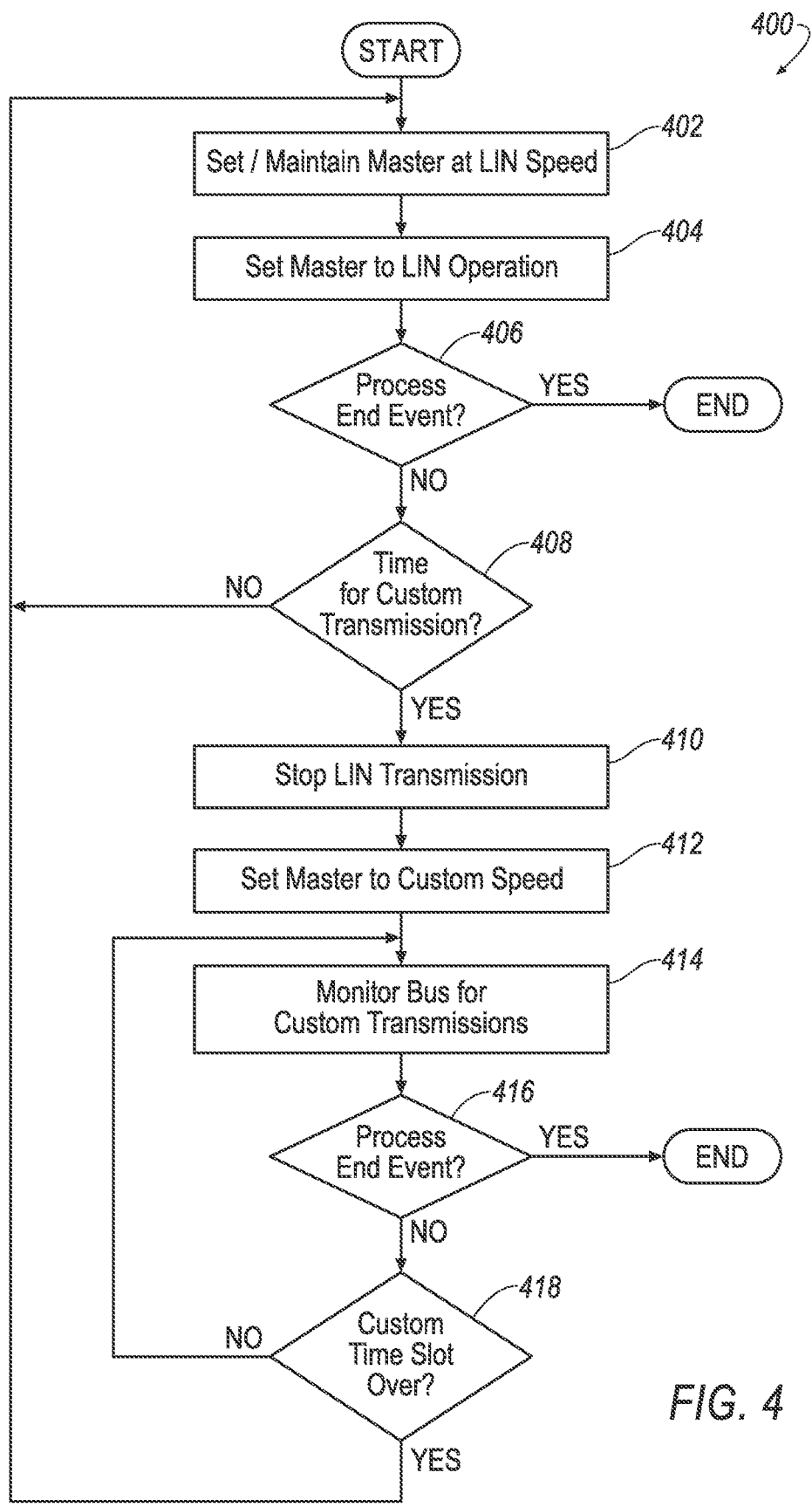
FIG. 4 is a flowchart of an example process for master hybrid operation.

FIG. 4 is a diagram of an example process 400 for hybrid operation of the smart master device 110. During hybrid operation, the smart master device 110 controls communications on the communications bus 105 with at least one LIN slave device 120, 130 (one or more LIN slave devices 130, and/or one or more smart slave devices 120 operating in LIN mode), and one custom slave device 130. Hybrid operation may also be referred to as the hybrid mode. During the process 400, the computer 112 may monitor, at multiple times, or substantially continuously, the communications bus 105 for collisions, as described in reference to the block 310 of process 300. In case of detecting a data collision, the computer 112 may call the process 200 starting in block 204. The process 400 begins in a block 402.

In the block 402, the computer 112 sets or maintains the smart master device 110, including the serial port, to LIN speed. The process 400 continues in a block 404.

In the block 404, the computer 112 sets the smart master device 110 to LIN operation. the computer 112, from time-to-time, sends messages to LIN slave devices 130 and smart slave devices 120 operating in LIN mode which may be on the communications bus 105. The messages may be commands for actuators 154 and sensors 156 coupled to the respective LIN slave devices 130 or smart slave devices 120 to execute operations within the vehicle 50. The process 400 continues in a block 406.

In the block 406, the computer 112 determines whether a process end event has occurred. The computer 112 may determine, for example, that the process end event has occurred based on messages on the communications bus 105, based on a message from the computer 150, based on an electrical signal indicating a power down is occurring for the vehicle 50, etc. In the case that a process end event is detected, the process 400 ends. Otherwise, the process 400 continues in a block 408.

In the block 408, the computer 112 determines whether a scheduled transmission from a custom slave device 130 is scheduled to occur within a predetermined amount of time. The predetermined amount of time may be, for example, an amount of time less than an amount of time required to perform one additional exchange of LIN messages. In the case that the scheduled transmission is scheduled to occur within the predetermined amount of time, the process 400 continues in a block 410. Otherwise, the process 400 continues in the block 402.

In the block 410, the computer 112 stops LIN transmissions.

Next, in a block 412, the computer 112 sets the smart master device 110, including the serial port, to custom speed and receiver mode. The process 400 continues in a block 414.

Next, in the block 414, the computer 112 monitors the communications bus 105 for communications from a custom slave device 130. In a case that the computer 112 receives transmissions from the custom slave device 130, the computer 112 processes the transmission. For example, the computer 112 may receive a transmission from the custom slave device 130 including data from a sensor 156, and the computer 112 may provide the data to the computer 150.

Next, the process 400 continues in a block 416. In the block 416, the computer 112 determines whether a process end event has occurred. The computer 112 may determine, for example, that the process end event has occurred based on messages on the communications bus 105, based on a message from the computer 150, based on an electrical signal indicating a power down is occurring for the vehicle 50, etc. In the case that the process end event is detected, the process 400 ends. Otherwise, the process 400 continues in a block 418.

In the block 418, the computer 112 determines whether the custom time slot for receiving transmissions from the custom slave device 130 is over or ending within a predetermined amount of time. The predetermined amount of time may include, for example, a buffer period, before an end of a time slot designated for the custom transmission. In the case that the custom transmission time is over or ending within the predetermined time, the process 400 continues in the block 402. Otherwise, the process 400 continues in the block 414.

Figure 5:
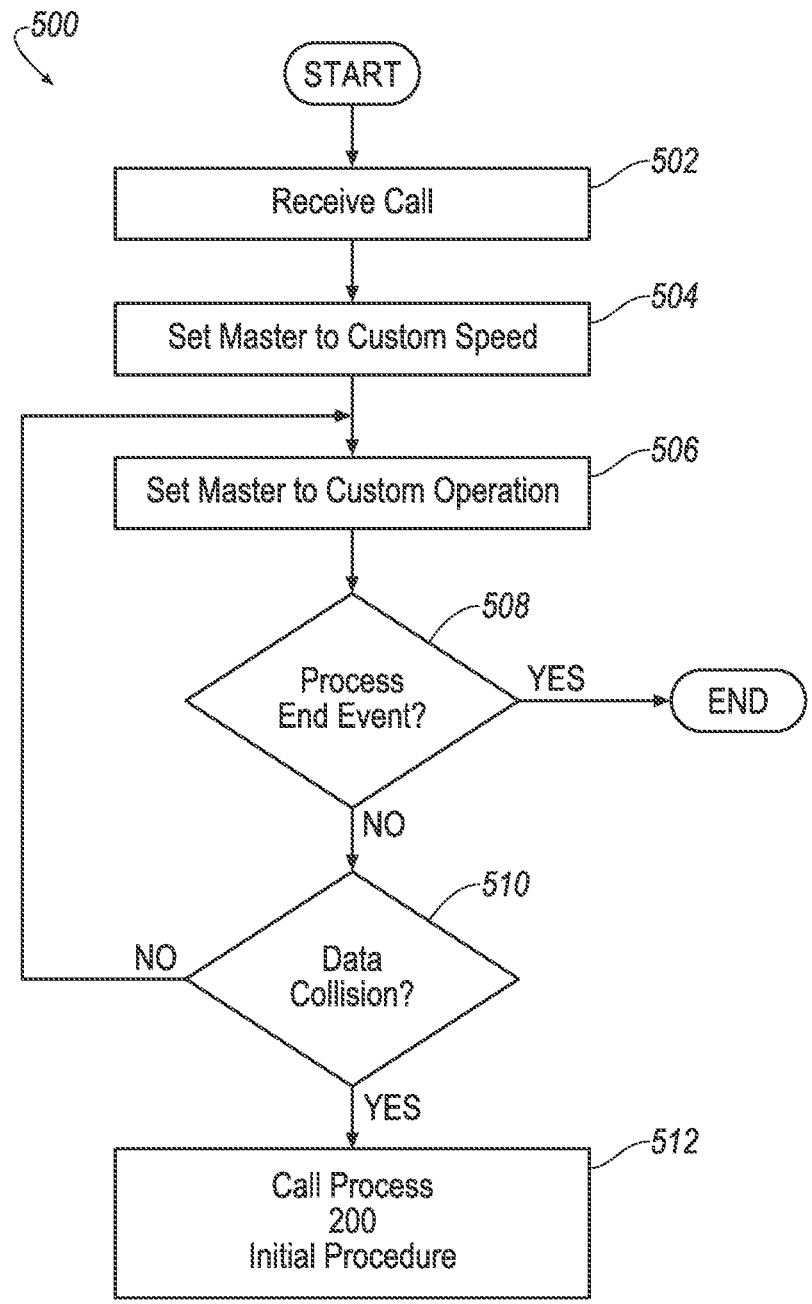
FIG. 5 is a flowchart of an example process for master custom operation.

FIG. 5 is a diagram of an example process 500 for custom operation of the smart master device 110. Custom operation may also be referred to as custom mode. During custom operation, the smart master device 110 is set to receive transmissions from a custom slave device 130. Upon receiving the transmissions, the smart master device 110 processes the transmissions, for example by providing received data to the computer 150. The process 500 begins in a block 502.

In the block 502, the computer 112 receives a call from the process 200, block 230, to set the smart master device 110 custom operation.

Next, in the block 504, the computer 112 sets the smart master device 110, including the serial port, to custom speed. Custom speed is a speed for receiving transmissions from a custom slave device 130, as described above.

Next, in a block 506, the computer sets the smart master device 110 to receive transmissions from the custom the slave device 130. The process continues in a block 508.

In the block 508, the computer 112 determines whether a process end event has occurred. The computer 112 may determine, for example, that the process end event has occurred based on messages on the communications bus 105, based on a message from the computer 150, based on an electrical signal indicating a power down is occurring for the vehicle 50, etc. In the case that the process end event is detected, the process 500 ends. Otherwise, the process 500 continues in a block 510.

In the block 510, the computer 112 determines whether a data collision has occurred on the communications bus 105. The data collision may indicate that an additional custom device 130 is on the communications bus 105 or that a smart slave device 120 has started operating in custom mode. In a case that the computer 112 determines that a data collision occurs, the process 500 continues in a block 512. Otherwise, the process 500 continues in the block 506 and the smart master device 110 continues custom operation. Although shown as a single block in the process 500, the computer 112 may monitor the communications bus 105 at multiple times, or substantially continuously during the process 500.

Figure 6:
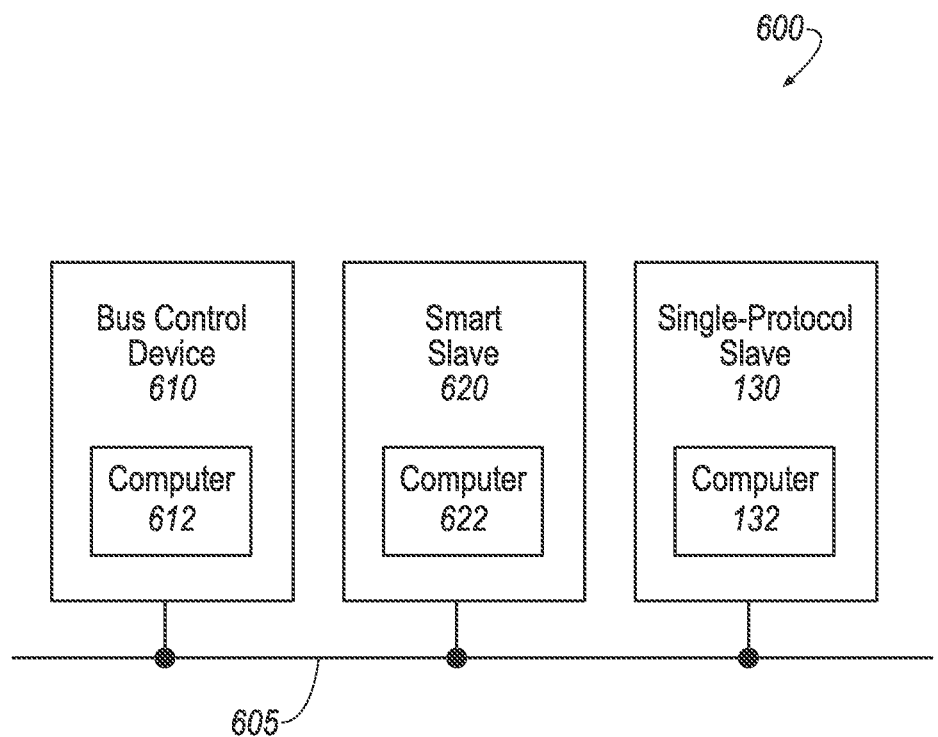
FIG. 6 is a diagram of an example bus system.

FIG. 6 is a diagram of an example communications system 600 which may be included in a system such as the vehicle 50 described above. The communications system 600 includes a smart slave device 620 programmed to determine a type of bus control device 610 that is currently controlling a communications bus 605. The communications system 600 includes the bus control device 610, one or more smart slave devices 620 and zero or more single-protocol slave devices 130 communicatively coupled on a communications bus 605.

The bus control device 610 includes a computer 612. The bus control device 610 may be either a calibration device 610 or a master device 610.

In a first case, the bus control device 610 is a calibration device 610. The calibration device 610 includes a computer 612 including one or more processors and memory including instructions for calibrating smart slave devices 620 and/or single-protocol slave devices 130 on the communications bus 605. The computer 612 is programmed for communications on the communications bus 605. The calibration device 610 may be removably connected, e.g. via a communications port, to the communications bus 605 to perform calibrations, perform measurements, perform functional testing, perform quality control data collection at respective manufacturing plants, etc., of smart slave devices 620, single-protocol slave devices 130, and other components (e.g., vehicle components) connected to the communications bus 605 via the smart slave devices 620 and single-protocol slave devices 130. The calibration device 610 also includes a serial port to couple the calibration device 610 to the communications bus 605 and send and receive messages.

During the time that the calibration device 610 is connected to the communications bus 605, the calibration device 610 assumes the role of the master device 610. That is, the calibration device 610 controls the flow of communications on the communications bus 605.

In a second case, the bus control device 610 is a master device 610. The master device 610 may be a LIN master device 610, a custom master device 610, or a smart master device 610. The LIN master device 610 operates only in LIN mode and cannot communicate with custom slaves 130. The custom master device 610 operates only in custom mode and cannot communicate with LIN slaves. The smart master device 610 operates as described in reference to the smart master device 110 above and can communicate with smart slaves 620, and single-protocol (LIN or custom) slaves 130.

The smart slave device 620 includes a computer 622. The smart slave device 620 and the computer 622 are the same or similar respectively to the smart slave device 620 and computer 122 described in reference to the communications system 100. The computer 622 is programmed for communications on the communications bus 605. The computer 622 is further programmed to determine whether the bus control device 610 is a calibration device 610 or a master device 610. In the case that the bus control device 610 is a master device 610, the smart slave device 620 is further programmed to determine whether the master device 610 is a LIN master device 610, a smart master device 610 operating in LIN mode (which may appear as a LIN master device 610), or a custom master device 610. The computer 622 then configures the smart slave device 620 to communicate with the identified calibration device 610 or master device 610. In the case that the master device 610 is a smart master device 610, the smart slave device 620 is programmed to recognize the smart master device 610 as a LIN master device 610, and establish LIN based communications with the smart master device 610. The serial port of the smart slave device 620 can be coupled to the communications bus 605 and to send and receive messages. One or more smart slave devices 620 may be included on the communications bus 605.

Figure 7A:
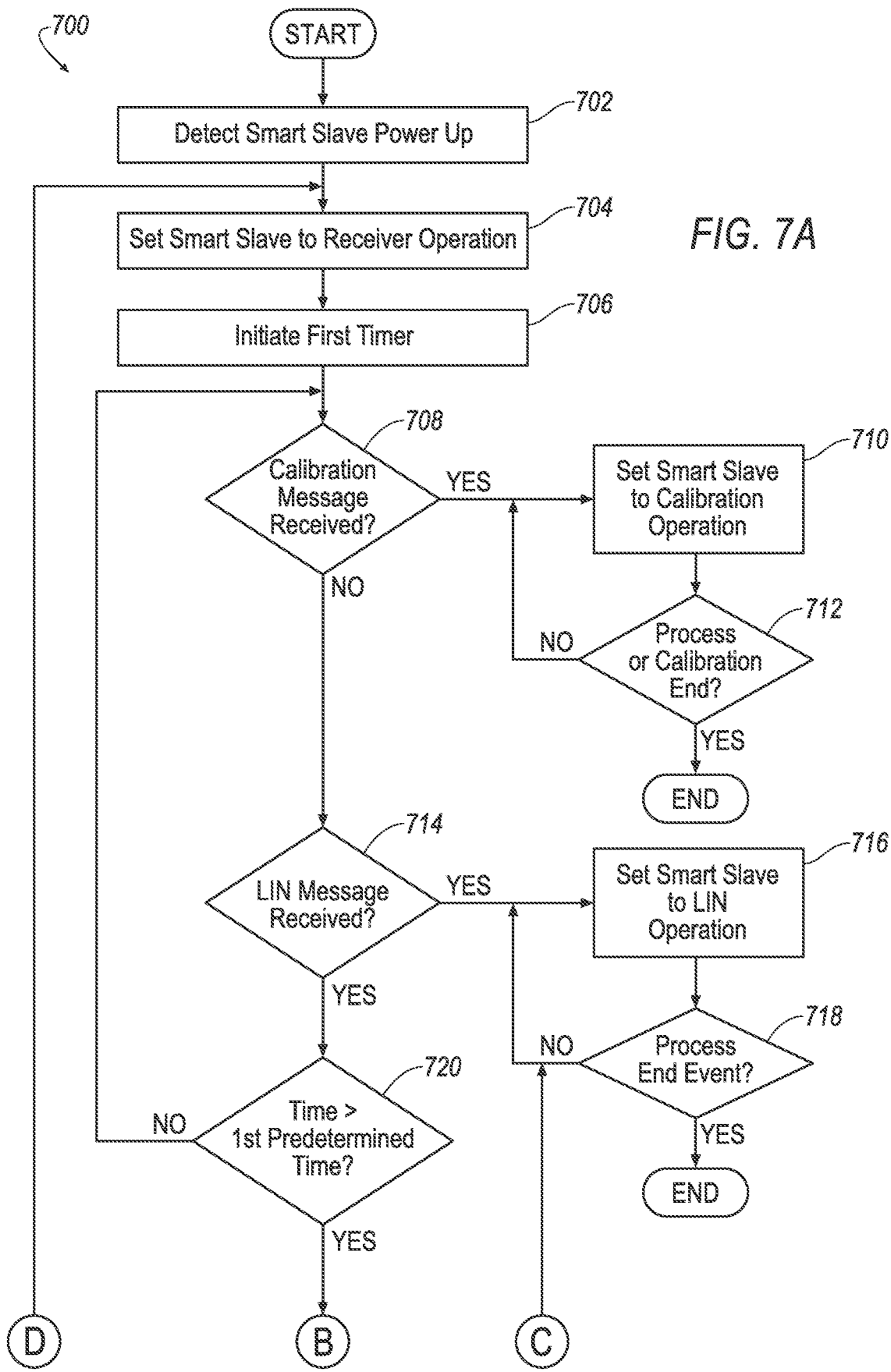
FIGS. 7A and 7B are a flowchart of an example process for a slave to select an operating mode.
Figure 7B:
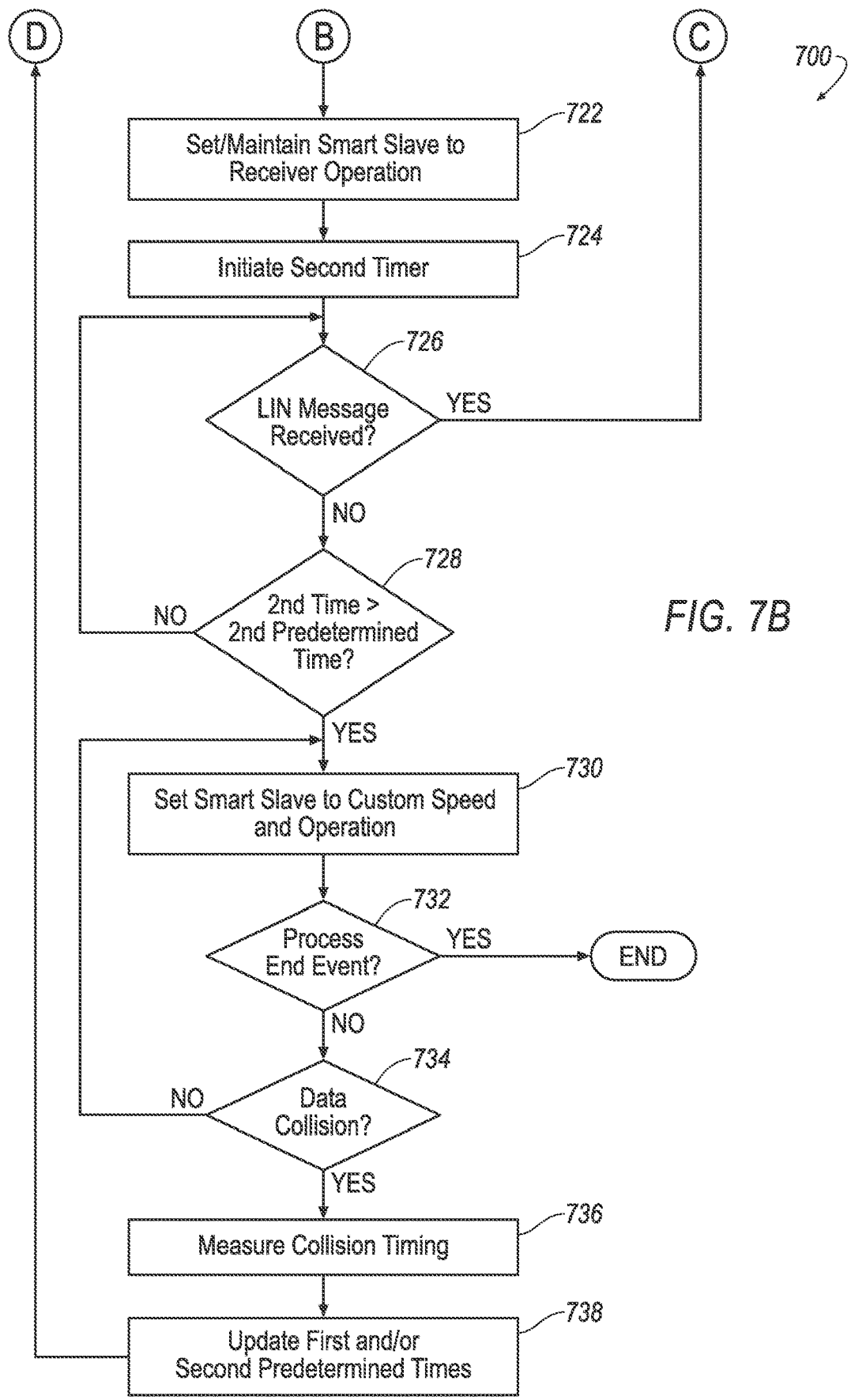

FIG. 7 is a diagram of an example process 700 for selecting an operating mode for a smart slave device 620 on a communications bus 605. Selecting an operating mode means determining whether a calibration is currently being performed on the communications bus 605 by a calibration device 610 or whether a master device 610 is current operating on the communications bus 605. In a case that a calibration is currently being performed by the calibration device 610 on the communications bus 605, the computer 622 on the smart slave device 620 selects a calibration operation operating mode. During calibration operation, the computer 622 on the smart slave device 620 receives and responds to communications from the calibration device 610. Calibration operation may also be referred to herein as calibration mode. In a case that the computer 622 determines that a calibration is not being performed and that a smart master device 610 is on the communications bus 605 that supports LIN operation, the computer selects LIN operation. In a case that the computer 622 determines that a calibration is not being performed and that a master device 610 supporting LIN operation is not present, the computer 622 selects custom operation. Custom operation may also be referred to as custom mode. The process 700 begins in a block 702.

In the block 702, the computer 622 detects a smart slave power up. A smart slave power up is an event indicating that the communications bus 605 will begin operation. For example, detecting the smart slave power up may include detecting that power has been supplied to the smart slave device 620. As another example, detecting the smart slave power up may include detecting a key-on of a vehicle or turning on of another system including the communications bus 605. Upon detecting the smart slave power up, the process 700 continues in a block 704.

In a block 704, the computer 622 sets the smart slave to a calibration speed to be able to receive calibration and potentially also LIN messages if the master device 610 were to transmit any LIN message at that calibration speed. The computer 622 begins to monitor the communications bus 605 for transmissions from a calibration device 610 and LIN transmissions from a smart master device 610. The process 700 continues in a block 706.

In the block 706, the computer 622 initiates a timer. The timer tracks the amount of time that the computer 622 monitors the communications bus 605 for calibration and/or LIN transmissions. The process 700 continues in a block 708.

In the block 708, the computer 622 determines whether a calibration message has been received. The computer 622 may identify the message as a calibration message, for example, based on a speed of the calibration message in a case that the calibration speed is different from the LIN speed. Additionally or alternatively, the computer 622 may identify the message as a calibration message based on the content, for example, based on an identifier identifying the device transmitting the message as a calibration device 610, based on a calibration command in the message, based on a length of the message, etc. In a case that the computer 622 determines that a calibration message has been received, the process 700 continues in a block 710. Otherwise, the process 700 continues in a block 714.

In the block 710, the computer 622 sets or maintains the smart slave device 620 in calibration operation. The process 700 continues in a block 712.

In the block 712, the computer 622 determines whether a process end event has occurred or if an exit calibration message has been received. The computer 622 may determine, for example, that the process end event has occurred based on messages on the communications bus 605, based on an electrical signal indicating a power down is occurring for a vehicle 50 system including the communications bus 605, etc. In the case that a process end event is detected, or if an exit calibration mode message has been received, the process 700 ends. Otherwise, the process 700 continues in a block 714.

In the block 714, the computer 622 determines whether a LIN control message has been received. A LIN control message indicates a presence of a master device 610 on the communications bus 605. The master device 610 may be a LIN (single-protocol) master device 610 or a smart master device 610 operating in LIN mode. In a case that a LIN control message has been received, the process 700 continues in a block 716. Otherwise, the process 700 continues in a block 720.

In the block 716, the computer 622 sets or maintains the smart slave device 620 in LIN operation. The process 700 continues in a block 718.

In the block 718, the computer 622 determines whether a process end event has occurred. The computer 622 may determine, for example, that the process end event has occurred based on messages on the communications bus 605, based on an electrical signal indicating a power down is occurring for a vehicle or other system including the communications bus 605, etc. In the case that the process end event is detected, the process 700 ends. Otherwise, the process 700 continues in a block 716.

In the block 720, which may follow the block 714, the computer 622 determines whether the amount of time that the computer 722 has been monitoring the communications bus 605 is greater than a first predetermined time. The first predetermined time is time within which a calibration transmission from a possible calibration device 610 on the communications bus 605 would have been expected. The first predetermined time may be pre-programmed into (stored in a memory of) the computer 622 based, for example, on specifications of the calibration device 610 that may be expected to be used to communicatively couple to the communications bus 105.

In a case that the amount of time is greater than the first predetermined time, the process 700 continues in a block 722. In the case that the amount of time is less than or equal to the predetermined time, the process continues in a block 708.

In the block 722, the computer 722 sets the smart slave device 620 to LIN speed and LIN operation. LIN operation for the smart slave device 620 means to monitor the communications bus 605 for LIN control messages broadcasting the presence of a master device 610 operating in LIN mode on the communications bus 605. The process 700 continues in a block 724.

In the block 724, the computer 622 initiates a second timer. The second timer measures an amount of time that has passed after the first timer reached the first predetermined time (see block 720) until a current time. The process 700 continues in a block 726.

In the block 726, the computer 622 determines whether a LIN control message has been received. In a case that a LIN control message has been received, the process 700 continues in a block 716. Otherwise, the process 700 continues in a block 728.

In the block 728, the computer 622 determines whether the amount of time that the computer 622 has been monitoring the communications bus 605, since expiration of the first predetermined time, is greater than a second predetermined time. The second predetermined time is an additional time, following the first predetermined time, within which the smart slave device 620 may receive a LIN control message from a master device 610, which may be operating at a LIN speed rather than at a calibration speed. The second predetermined time may be pre-programmed into (stored in a memory of) the computer 622 based, for example, on specifications of a master device 610 that expected to be used on the communications bus 605.

In a case that the amount of time is greater than the second predetermined time, the process 700 continues in a block 730. In the case that the amount of time is less than or equal to the second predetermined time, the process continues in the block 726.

In the block 730, the computer 622 sets the smart slave device 620 for custom operation. That is, the computer 622 sets the smart slave device 620 to transmit messages at a custom speed and according to a custom transmission schedule. The custom transmission schedule may be preprogrammed into (stored in memory of) the computer 622. The process 700 continues in a block 732.

In the block 732, the computer 622 determines whether a process end event has occurred. The computer 622 may determine, for example, that the process end event has occurred based on messages on the communications bus 605, based on an electrical signal indicating a power down is occurring for the vehicle or other system in which the communications system 600 is operating, etc. In the case that the process end event is detected, the process 700 ends. Otherwise, the process 700 continues in a block 734.

In the block 734, the computer 622 determines whether a data collision has occurred on the communications bus 105. In a case that the computer 622 determines that a data collision occurs, the process 700 continues in a block 736. Otherwise, the process 700 continues in the block 730 and the smart slave device 620 continues custom operation. Although shown as a single block in the process 700, the computer 622 may monitor the communications bus 605 at multiple times, or substantially continuously during the process 700.

In the block 736, the computer 622 measures the timing of the data collision and may measure additional timing data. The process 700 continues in a block 738.

In the block 738, the computer 622 updates a value for the first and/or second predetermined times.

Various approaches may be taken to update the first and/or second predetermined times. The computer 622 may determine a modifier y to update the value of the first predetermined time. For example, for an nth collision detection, where n is the number of data collisions since the last master power up, the computer 622 may set the modifier y to be a fixed modifier. Alternatively, the computer 622 may set the modifier y to be a pseudo random number that is:

based on a random number generator;
calculated/interpreted based on data received by the smart master device 110;
based on the number n;
calculated based on mathematical operations on past and/or present date and time; and/or
calculated based on mathematical operations based on product part number.

The above list of examples is not intended to be limiting. One or more of the above examples may be used in combination. Further, other methods for generating a pseudo random number based on system data, may be used.

Based on the modifier y, the updated first and/or second predetermined time may then be calculated according to any one or more of the following approaches:

New first and/or second predetermined times=(Previous first and/or second predetermined times)+(y).

This assumes (y)>0

New first and/or second predetermined times=(Previous first and/or second predetermined times)∧(y).

This assumes (y)>1.

New first and/or second predetermined time=(Previous first and/or second predetermined times)*(y).

This assumes (x)>1

New first and/or second predetermined times=(Sum of Previous first and/or second predetermined times)+(y).

This assumes (y)>0.

Setting the modifier y based on a pseudo random number may have the benefit of preventing the smart slave device 620 from locking into a first predetermined time sequence that does not optimize for a fast determination of the communications bus configuration and/or does not converge on a stable determination of which type of bus control device 610 is operating on the communications bus 605.

As another example, the computer 622 may be programmed to determine the first and/or second predetermined times based on the timing of one or more data collisions. For example, the computer 622 may determine that the previously applied first predetermined time was not long enough to detect the presence of the calibration device 610 and/or that the second predetermined time, when combined with the first predetermined time, was not long enough to detect the presence of a master device 610 operating in LIN mode. Based on the timing of the data collision, the computer 622 may be able to determine or estimate a timing of expected transmissions from a calibration device 610 or master device 610 operation in LIN mode. The computer 622 may then be programmed to set the first predetermined time to be longer than an expected time for receiving a transmission from the calibration device 610 or set a sum of the first predetermined time and the second predetermined time to be longer than an expected time for receiving a LIN transmission from a master device 610 operating in LIN mode.

The computer 622 will typically be programmed to increase the first and/or second predetermined times until data collisions no longer occur. Initially decrementing the first and/or second predetermined time following a data collision may result in reduced likelihood of detecting a calibration device 610 or master device 610 operating in LIN mode on the communications bus 605. To avoid excessive increases to the first and/or second predetermined time, the computer 622 may apply additional constraints on y. For example, y may be limited to a value equal to or below a first modifier value. As another example, when y exceeds the first modifier value, the computer 622 may decrease a value of y until it is below a second modifier value, where the second modifier value is less than the first modifier value.

After establishing the first and/or second predetermined times as described above, the computer 622 for the smart slave device 620 may be programmed to retain the updated first predetermined time in non-volatile memory such as EEPROM such that the first predetermined time is available following subsequent power-up events. Further, to optimize the first predetermined time, the computer 622 may be programmed to decrement the first predetermined time following each power-up, to iteratively seek a first predetermined time that is just above an amount of time to avoid a data collision. The process 700 continues in a block 704.

As used herein, the term "based on" means based on in whole or in part.

In general, the computing systems and/or devices described may employ any of a number of computer operating systems, including, but by no means limited to, versions and/or varieties of the Ford Sync® application, AppLink/Smart Device Link middleware, the Microsoft Automotive® operating system, the Microsoft Windows® operating system, the Unix operating system (e.g., the Solaris® operating system distributed by Oracle Corporation of Redwood Shores, Calif.), the AIX UNIX operating system distributed by International Business Machines of Armonk, N.Y., the Linux operating system, the Mac OSX and iOS operating systems distributed by Apple Inc. of Cupertino, Calif., the BlackBerry OS distributed by Blackberry, Ltd. of Waterloo, Canada, the Android operating system developed by Google, Inc. the Open Handset Alliance, or the QNX® CAR Platform for Infotainment offered by QNX Software Systems, and the Duer OS offered by Baidu, Inc. Examples of computing devices include, without limitation, an on-board vehicle computer, a computer workstation, a server, a desktop, notebook, laptop, or handheld computer, or some other computing system and/or device.

Computers and computing devices generally include computer-executable instructions, where the instructions may be executable by one or more computing devices such as those listed above. Computer executable instructions may be compiled or interpreted from computer programs created using a variety of programming languages and/or technologies, including, without limitation, and either alone or in combination, Java™, C, C++, Matlab, Simulink, Stateflow, Visual Basic, Java Script, Perl, HTML, Python, etc. Some of these applications may be compiled and executed on a virtual machine, such as the Java Virtual Machine, the Dalvik virtual machine, or the like. In general, a processor (e.g., a microprocessor) receives instructions, e.g., from a memory, a computer readable medium, etc., and executes these instructions, thereby performing one or more processes, including one or more of the processes described herein. Such instructions and other data may be stored and transmitted using a variety of computer readable media. A file in a computing device is generally a collection of data stored on a computer readable medium, such as a storage medium, a random-access memory, etc.

Memory may include a computer-readable medium (also referred to as a processor-readable medium) that includes any non-transitory (e.g., tangible) medium that participates in providing data (e.g., instructions) that may be read by a computer (e.g., by a processor of a computer). Such a medium may take many forms, including, but not limited to, non-volatile media and volatile media. Non-volatile media may include, for example, optical or magnetic disks and other persistent memory. Volatile media may include, for example, dynamic random-access memory (DRAM), which typically constitutes a main memory. Such instructions may be transmitted by one or more transmission media, including coaxial cables, copper wire and fiber optics, including the wires that comprise a system bus coupled to a processor of an ECU. Common forms of computer-readable media include, for example, a floppy disk, a flexible disk, hard disk, magnetic tape, any other magnetic medium, a CD-ROM, DVD, any other optical medium, punch cards, paper tape, any other physical medium with patterns of holes, a RAM, a PROM, an EPROM, a FLASH-EEPROM, any other memory chip or cartridge, or any other medium from which a computer can read. CD-ROM and DVD are examples of write once/read many (WORM) devices.

Databases, data repositories or other data stores described herein may include various kinds of mechanisms for storing, accessing, and retrieving various kinds of data, including a hierarchical database, a set of files in a file system, an application database in a proprietary format, a relational database management system (RDBMS), etc. Each such data store is generally included within a computing device employing a computer operating system such as one of those mentioned above, and are accessed via a network in any one or more of a variety of manners. A file system may be accessible from a computer operating system, and may include files stored in various formats. An RDBMS generally employs the Structured Query Language (SQL) in addition to a language for creating, storing, editing, and executing stored procedures, such as the PL/SQL language mentioned above.

In some examples, system elements may be implemented as computer-readable instructions (e.g., software) on one or more computing devices (e.g., servers, personal computers, etc.), stored on computer readable media associated therewith (e.g., disks, memories, etc.). A computer program product may comprise such instructions stored on computer readable media for carrying out the functions described herein.

With regard to the media, processes, systems, methods, heuristics, etc. described herein, it should be understood that, although the steps of such processes, etc. have been described as occurring according to a certain ordered sequence, such processes may be practiced with the described steps performed in an order other than the order described herein. It further should be understood that certain steps may be performed simultaneously, that other steps may be added, or that certain steps described herein may be omitted. In other words, the descriptions of processes herein are provided for the purpose of illustrating certain embodiments, and should in no way be construed so as to limit the claims.

Accordingly, it is to be understood that the above description is intended to be illustrative and not restrictive. Many embodiments and applications other than the examples provided would be apparent to those of skill in the art upon reading the above description. The scope of the invention should be determined, not with reference to the above description, but should instead be determined with reference to the appended claims, along with the full scope of equivalents to which such claims are entitled. It is anticipated and intended that future developments will occur in the arts discussed herein, and that the disclosed systems and methods will be incorporated into such future embodiments. In sum, it should be understood that the invention is capable of modification and variation and is limited only by the following claims.

All terms used in the claims are intended to be given their plain and ordinary meanings as understood by those skilled in the art unless an explicit indication to the contrary in made herein. In particular, use of the singular articles such as "a," "the," "said," etc. should be read to recite one or more of the indicated elements unless a claim recites an explicit limitation to the contrary.

What is claimed is:

1. A first device comprising a computer including a processor and a memory, the memory including instructions such that the processor is programmed to:
identify a configuration on a communications bus comprising one and only one of (1) a first bus configuration including the first device and a local interconnect network (LIN) device, and no custom device, (2) a second bus configuration including the first device and a custom device, and no LIN device, and (3) a third bus configuration including the first device and both the LIN device and the custom device, wherein the LIN device is a two-way communications device programmed to receive and respond to LIN messages from the first device and the custom device is a one-way communications device programmed only to transmit messages to the first device, wherein, to identify the communications bus configuration, the processor is programmed to:
detect a power-up; and
operate in a receive mode to await receipt of a custom message from the custom device for a first predetermined amount of time after detecting the power-up;
select an operating mode specified for communications with the identified bus configuration; and
control send and receive times of the first device based on the selected operating mode.

2. The first device of claim 1, wherein, the processor is further programmed to:
set an operation of the first device to communicate with LIN devices programmed to receive and respond to LIN messages from the first device based on not receiving the custom message from the custom device within the first predetermined amount of time after detecting the power-up.

3. The first device of claim 1, wherein, to identify the communications bus configuration, the processor is further programmed to:
set, upon receiving the custom message from the custom device within the first predetermined amount of time, the first device to communicate with a possible LIN device on the communications bus;
transmit a LIN control message to the possible LIN device; and
listen for a response to the LIN control message from the possible LIN device on the communications bus for a response time.

4. The first device of claim 3, wherein, the processor is further programmed to:
set, in a case of not receiving the response to the LIN control message within the response time, an operation of the first device to receive messages from the custom device.

5. The first device of claim 3, wherein the processor is further programmed to:
determine, based on receiving the response to the LIN control message, the LIN device on the communications bus; and
set an operation of the first device to communicate with both the LIN device and the custom device.

6. The first device of claim 1, wherein the processor is further programmed to:
detect a data collision on the communications bus;
update, based on detecting the data collision, the first predetermined amount of time; and
store the updated first predetermined amount of time.

7. The first device of claim 6, wherein the processor is further programmed to:
operate in the receive mode to receive the custom message from the custom device for the updated first predetermined amount of time;
set, upon receiving the custom message from the custom device within the updated first predetermined time, the first device to communicate with a possible LIN device on the communications bus;
transmit a LIN control message to the possible LIN device; and
listen for a response to the control message from the possible LIN device on the communications bus for a response time.

8. A first device comprising a computer including a processor and a memory, the memory including instructions to program the processor such that the processor is programmed to:
identify that a second device on a communications bus is one and only one of (1) a calibration device programmed to control two-way communications with the first device, (2) a local interconnect network (LIN) master device programmed to control two-way communications with the first device and (3) a custom master device programmed to only receive messages from the first device, wherein to identify the second device on the communications bus, the processor is further programmed to:
detect a power up; and
set a communications speed for receiving, on the communications bus, either (1) a calibration message from the calibration device or (2) a LIN message from the LIN master device; and
select an operating mode specified for communication with the identified one of the calibration device, the LIN master device, and the custom master device.

9. The first device of claim 8, wherein the processor is further programmed to:
select the operating mode specified for communications with the calibration device based on receiving the calibration message within a first predetermined amount of time.

10. The first device of claim 8, wherein the processor is further programmed to:
select the operating mode specified for communications with the LIN master device based on receiving the LIN message within a first predetermined amount of time.

11. The first device of claim 8, wherein the processor is further programmed to:
initiate a second timer based on receiving neither the calibration message nor the LIN message within a first predetermined amount of time.

12. The first device of claim 11, wherein the processor is further programmed to:
select the operating mode specified for communications with the LIN master device based on receiving the LIN message within a second predetermined amount of time.

13. The first device of claim 11, wherein the processor is further programmed to:
select the operating mode specified for communications with the custom master device based on not receiving the LIN message within a second predetermined amount of time.

14. The first device of claim 13, wherein the processor is further programmed to:
detect a collision on the communications bus: and
update at least one of the first predetermined amount of time and the second predetermined amount of time.

15. A system comprising:
a communications bus;
a first device including a first computer including a first processor and a first memory, the first memory including first instructions such that the first processor is programmed to:
identify a configuration on the communications bus comprising one and only one of (1) a first bus configuration including the first device and a local interconnect network (LIN) device and no custom device, (2) a second bus configuration including the first device and a custom device, and no LIN device, and (3) a third bus configuration including the first device and both the LIN device and the custom device, wherein the LIN device is a two-way communications device programmed to receive and respond to LIN messages from the first device and the custom device is a one-way communications device programmed only to transmit messages to the first device, wherein, to identify the communications bus configuration, the processor is programmed to:
detect a power-up; and
operate in a receive mode to await receipt of a custom message from the custom device for a first predetermined amount of time after detecting the power-up;
select an operating mode specified for communications with the identified bus configuration; and
control send and receive times of the first device based on the selected operating mode; and
a second device including a second computer including a second processor and a second memory, the second memory including second instructions to program the second processor such that the second processor is programmed to:
identify that a third device on the communications bus is one and only one of (1) a calibration device programmed to control two-way communications with the second device, (2) a LIN master device programmed to control two-way communications with the second device and (3) a custom master device programmed to only receive messages from the second device; and
select an operating mode specified for communication with the identified one of the calibration device, the LIN master device and the custom master device, wherein the third device and the first device may be a same device.

16. The system of claim 15, wherein, to identify a type of the second device on the communications bus, the first processor is further programmed to:
determine, after the first predetermined amount of time that no custom message was received;
set an operation of the first device to communicate with second LIN devices programmed to receive and respond to a LIN message from the first device based on not receiving the custom message from the second custom device within the first predetermined amount of time after detecting the power-up; and
transmit the LIN message on the communications bus.

17. The system of claim 16, wherein, to identify the first device on the communications bus, the second processor is further programmed to:
detect the power-up;
receive the LIN message from the LIN master device within a second predetermined amount of time after the power-up; and
determine that the first device is a LIN master device based on receiving the LIN message within the second predetermined amount of time.

18. The system of claim 17, wherein, the second processor is further programmed to:
send a response to the first device upon receiving the LIN message; and
further wherein, the first processor is further programmed to:

receive the response within a predetermined response time; and determine, based on the response, that the second device is a LIN slave device.

* * * * *